US011920676B2

(12) United States Patent
Tang et al.

(10) Patent No.: US 11,920,676 B2
(45) Date of Patent: Mar. 5, 2024

(54) METHOD AND DEVICE FOR CONTROLLING STATE SWITCHING OF FLUID TORQUE CONVERTER, AND STORAGE MEDIUM

(71) Applicants: Zhejiang Liankong Technologies Co., Ltd, Ningbo (CN); Zhejiang Geely Holdings Group Co., Ltd, Hangzhou (CN)

(72) Inventors: Guojie Tang, Ningbo (CN); Lei Liu, Ningbo (CN); Yan Sun, Ningbo (CN); Wenyu Hu, Ningbo (CN); Liqing Shao, Ningbo (CN)

(73) Assignees: Zhejiang Liankong Technologies Co., Ltd, Ningbo (CN); Zhejiang Geely Holdings Group Co., Ltd, Hangzhou (CN)

( * ) Notice: Subject to any disclaimer, the term of this patent is extended or adjusted under 35 U.S.C. 154(b) by 0 days.

(21) Appl. No.: 17/999,855

(22) PCT Filed: May 25, 2020

(86) PCT No.: PCT/CN2020/092153
§ 371 (c)(1),
(2) Date: Nov. 24, 2022

(87) PCT Pub. No.: WO2021/237421
PCT Pub. Date: Dec. 2, 2021

(65) Prior Publication Data
US 2023/0213095 A1 Jul. 6, 2023

(51) Int. Cl.
*F16H 61/14* (2006.01)
*F16H 59/14* (2006.01)
*F16H 59/18* (2006.01)
*F16H 59/44* (2006.01)
(Continued)

(52) U.S. Cl.
CPC ............ *F16H 61/14* (2013.01); *F16H 59/14* (2013.01); *F16H 59/18* (2013.01); *F16H 59/44* (2013.01);
(Continued)

(58) Field of Classification Search
CPC .................................. F16H 61/14; F16H 59/14
See application file for complete search history.

(56) References Cited

FOREIGN PATENT DOCUMENTS

| CN | 1629520 A | 6/2005 |
|----|-----------|--------|
| CN | 106536313 A | 3/2017 |

(Continued)

OTHER PUBLICATIONS

The office action of CN application No. 202080100035.6 dated Nov. 1, 2023.
(Continued)

*Primary Examiner* — Derek D Knight
(74) *Attorney, Agent, or Firm* — Andrew C. Cheng

(57) ABSTRACT

Disclosed are a method and device for controlling the state switching of a fluid torque converter, a vehicle and a storage medium, the method including: obtaining a target instruction when the torque converter of the vehicle is in a locked state, the target instruction triggering a change in the torque transmission direction of a transmission system of the vehicle; obtaining a state parameter, and determining whether the current vehicle is in a target operating condition according to the state parameter; and if the current vehicle is in the target operating condition, switching the fluid torque converter to an open state, and switching the torque converter back to the locked state after maintaining the open state for a preset period of time.

18 Claims, 6 Drawing Sheets

(51) Int. Cl.
    *F16H 59/48*     (2006.01)
    *F16H 59/50*     (2006.01)
    *F16H 59/70*     (2006.01)
    *F16H 59/72*     (2006.01)
    *F16H 59/74*     (2006.01)
    *F16H 59/36*     (2006.01)

(52) U.S. Cl.
    CPC ............ *F16H 59/48* (2013.01); *F16H 59/50* (2013.01); *F16H 59/70* (2013.01); *F16H 59/72* (2013.01); *F16H 59/74* (2013.01); *F16H 2059/183* (2013.01); *F16H 2059/366* (2013.01)

(56) References Cited

FOREIGN PATENT DOCUMENTS

| | | | |
|---|---|---|---|
| CN | 107435734 A | 12/2017 | |
| CN | 108700191 A | 10/2018 | |
| CN | 109578575 A | 4/2019 | |
| EP | 1643165 A2 * | 4/2006 | ........... F16H 61/143 |
| EP | 3064809 A1 | 9/2016 | |
| EP | 3168503 A1 | 5/2017 | |
| JP | H11182671 A | 7/1999 | |

OTHER PUBLICATIONS

The search report of CN application No. 202080100035.6 dated Nov. 1, 2023.
The extended European search report of EP application No. 20937263.0 dated Oct. 27, 2023.

\* cited by examiner

METHOD AND DEVICE FOR CONTROLLING STATE SWITCHING OF FLUID TORQUE CONVERTER, AND STORAGE MEDIUM

CROSS REFERENCE TO RELATED APPLICATIONS

The present disclosure is a 35 U.S.C. § 371 National Phase conversion of International (PCT) Patent Application No. PCT/CN2020/092153, filed on May 25, 2020. The entire contents of the above-identified applications are incorporated herein by reference. The PCT International Patent Application was filed and published in Chinese.

TECHNICAL FIELD

This specification relates to the field of fluid torque converters, and in particular, to a method for controlling state switching of a fluid torque converter, a device, and a storage medium.

BACKGROUND

For a vehicle equipped with a fluid torque converter, it is possible to improve transmission efficiency of the vehicle using a locking function of the fluid torque converter. Moreover, since an engine can be in an oil-off state during a locking state, oil consumption can be lowered. Therefore, designers of vehicles often widely use locking functions of fluid torque functions in feasible scenarios, such that fluid torque converters can be in locking states in more and more scenarios.

However, when a fluid torque converter is in a locking state, an output shaft of an engine is mechanically linked with an input shaft of a gearbox. In this condition, changes of transmission directions of a transmission system of a vehicle may cause jitter of transmission parts in the transmission system, then smoothness of operation of the vehicle is reduced.

SUMMARY OF THE DISCLOSURE

Aiming at the problem existing in the prior art that: when a fluid torque converter is locked, since there are inherent gaps between transmission mechanisms in a transmission system and the transmission system is in a hard connection state, when a direction of a torque output by the transmission system is switched, transmission parts may generate impacts, thereby resulting in shock of a whole vehicle, this specification provides a method for controlling state switching of a fluid torque converter, a device, and a storage medium.

In order to achieve the aforesaid purpose, technical solutions adopted by this specification are as follows.

In one aspect, this specification provides a method for controlling state switching of a fluid torque converter, the method includes: obtaining a target instruction when a fluid torque converter of a vehicle is in a locked state, wherein the target instruction triggers a change of a torque transmission direction of a transmission system of the vehicle; obtaining a state parameter, and determining whether the current vehicle is in a target operating condition according to the state parameter; and if the current vehicle is in the target operating condition, switching the fluid torque converter to an open state, and switching the fluid torque converter back to the locked state after maintaining the open state for a preset period of time.

In another aspect, this specification provides a device for controlling state switching of a fluid torque converter, the device includes: a target instruction obtaining module configured to obtain a target instruction when a fluid torque converter of a vehicle is in a locked state, wherein the target instruction triggers a change of a torque transmission direction of a transmission system of the vehicle; a target operating condition determining module configured to obtain a state parameter, and determine whether the current vehicle is in a target operating condition according to the state parameter; and a state switching module configured to: if the current vehicle is in the target operating condition, switch the fluid torque converter to an open state, and switch the fluid torque converter back to the locked state after maintaining the open state for a preset period of time.

In another aspect, this specification provides a computer storage medium, the computer storage medium stores at least one instruction or at least one program, the at least one instruction or at least one program is loaded and executed by a processor to implement the method for controlling state switching of a fluid torque converter.

The technical solutions of this specification brings advantageous effect as follows: in this specification, by accurately recognizing a target operating condition, a fluid torque converter is controlled to open quickly and briefly under the target operating condition, such that shock caused by impact of transmission components is absorbed when a torque transmission direction of a transmission system is switched, and jitter of a vehicle is reduced. Moreover, by controlling the fluid torque converter to close again after briefly opening, fuel consumption is reduced. The fuel consumption of the vehicle is taken into account while achieving vehicle shock absorption, thus driving experience of users is improved on the basis of ensuring fuel economy.

BRIEF DESCRIPTION OF THE DRAWINGS

In order to describe technical solutions and advantages in embodiments of this specification or in the prior art more clearly, drawings required being used in description of the embodiments or of the prior art will be simply introduced below. It is obvious that the drawings in the following description are merely some embodiments of the present invention. For one of ordinary skill in the art, other drawings can be obtained according to these drawings without paying creative work.

DETAILED DESCRIPTION

In order to make technicians in this technical field better understand solutions of the present invention, technical solutions in embodiments of this specification will be described clearly and entirely below in combination with the drawings in the embodiments of this specification. It is obvious that the described embodiments are merely some embodiments but not all embodiments of the present invention. Based on embodiments of the present invention, all of other embodiments obtained by one of ordinary skill in the art without paying creative work belong to the protection scope of the present invention.

It should be noted that the terms "first", "second", etc. in the specification, claims, and aforesaid drawings of the present invention are intended to distinguish similar objects and not necessarily to describe a particular order or sequence. It shall be understood that data so used may be interchangeable in appropriate conditions so that the embodiments of the present invention described herein may be performed in orders other than those illustrated or described herein. Furthermore, the terms "include", "have", and any variation thereof are intended to cover non-exclusive inclusion, for example, a process, method, system, product, or server that contains a series of steps or units need not be limited to those steps or units that are clearly listed, rather, it may include other steps or units that are not clearly listed or inherent to this process, method, product, or equipment. In order to facilitate full elaboration of the technical solutions in the embodiments in this specification, the embodiments in this specification first unify the relevant technical terms.

AT automatic transmission: AT (automatic transmission) represents hydraulic automatic transmission. It is composed of a fluid torque converter, a planetary gear transmission, a control mechanism, etc.

CVT stepless transmission: a gear ratio of a CVT (Continuously Variable Transmission) stepless transmission is not a stop point but a series of continuous values, thereby achieving good economy, power performance and ride comfort. Some CVT stepless transmissions can also be equipped with fluid torque converters.

Figure 1:
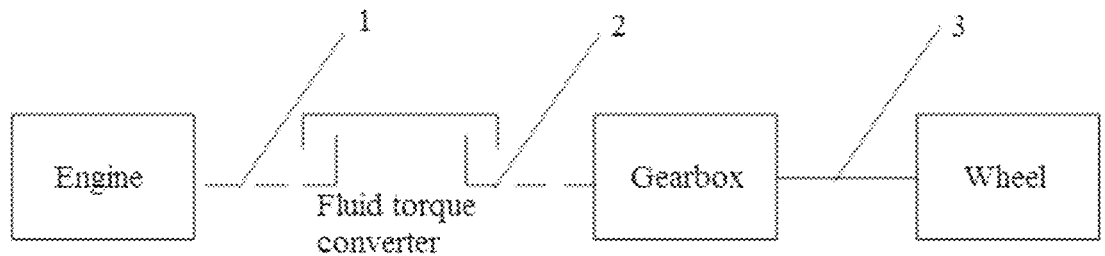
FIG. 1 is a schematic diagram of a transmission system of a vehicle equipped with a fluid torque converter provided by an embodiment of this specification, wherein the fluid torque converter is in a locked state.

Referring to FIG. 1, which shows a schematic diagram of a transmission system of a vehicle equipped with a fluid torque converter when the fluid torque converter is in a locked state. As shown in FIG. 1, an output shaft 1 of an engine of the vehicle is connected with the fluid torque converter, the fluid torque converter is connected with an input shaft 2 of a gearbox, an output shaft 3 of the gearbox drives wheels to move through a drive shaft. When the fluid torque converter is in the locked state, the output shaft 1 of the engine is mechanically linked with the input shaft 2 of the gearbox, and torque transmission directions are different when the vehicle is in different states.

When the vehicle is in a driving state (accelerated state), the engine outputs a torque. A transmission direction of the torque in FIG. 1 is engine-fluid torque converter-gearbox-driving shaft-wheel, that is, the transmission system is in positive engagement.

When the vehicle is in a driven state (decelerated state), the vehicle relies on inertia of the whole vehicle to move. A transmission direction of the torque in FIG. 1 is wheel-driving shaft-gearbox-fluid torque converter-engine, that is, the transmission system is in reverse engagement.

Obviously, torque transmission directions of the transmission system in the driving state and in the driven state are different. When the vehicle is switched from the driving state to the driven state, or switched from the driven state to the driving state, change of the torque transmission directions of the transmission system will occur. When the fluid torque converter is in a locked state, an output shaft of the engine is mechanically linked with an input shaft of the gearbox, and there are inherent transmission gaps between other transmission mechanisms in the transmission system, for example, a transmission gap between a driving gear and a driven gear of a planetary gear, a transmission gap between counter gears, a transmission gap between main reducer gears, a transmission gap between a driving shaft and a wheel, and so on; they make the torque transmission direction of the transmission system change, and thus cause transmission elements of the transmission system to generate impact, thereby generating shock of the vehicle.

Figure 2:
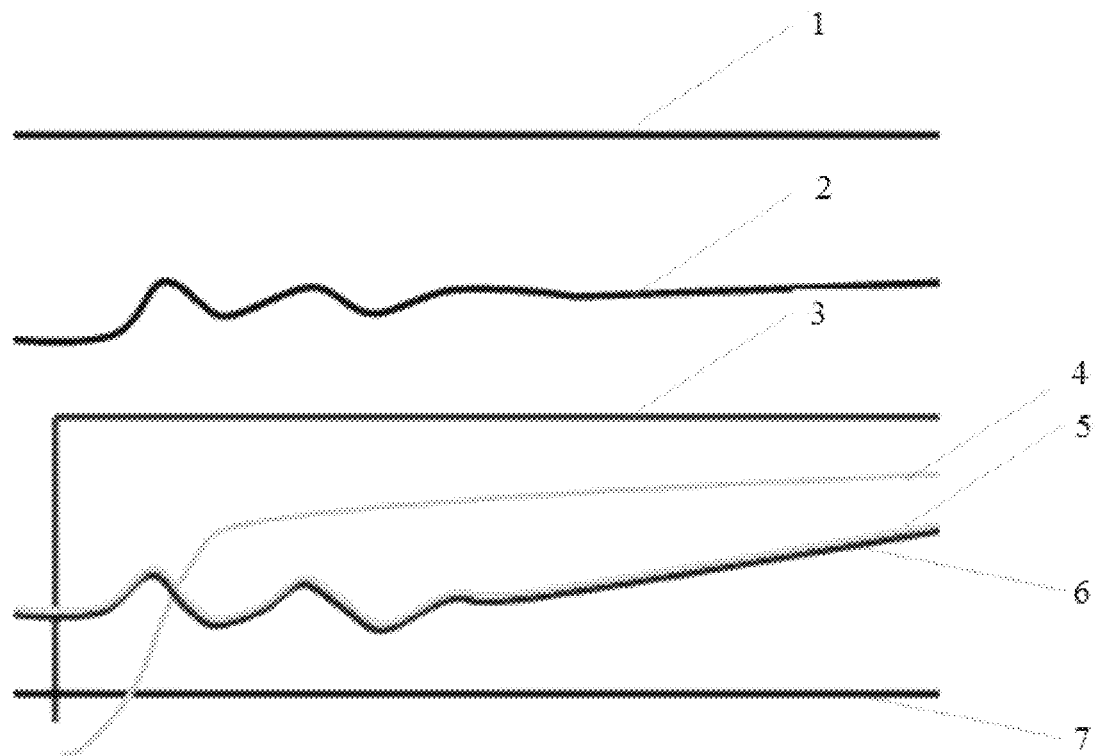
FIG. 2 is a schematic diagram of changes of parameters related to a vehicle in the prior art in a scene of stepping on an accelerator when the vehicle coasts provided by an embodiment of this specification, wherein a fluid torque converter is in a locked state.

Referring to FIG. 2, which shows a schematic diagram of changes of parameters related to a vehicle in the prior art in a scene of stepping on an accelerator when the vehicle coasts, wherein a fluid torque converter is in a locked state. Among them, the curve 1 represents that the fluid torque converter is in the locked state, the curve 2 represents an a longitudinal acceleration of the vehicle, the curve 3 represents an accelerator, the curve 4 represents a torque of an engine, the curve 5 represents a rotation speed of the engine, the curve 6 represents a rotation speed of an input shaft of a gearbox, and a curve 7 represents a gear position of the gearbox. The vehicle is in a driven state when coasting, and the vehicle enters a driving state after a user steps on the accelerator, thus the state of the vehicle generates switching from the driven state to the driving state. As shown by the curve 1 in FIG. 2, the fluid torque converter is always in the locked state; as shown by the curve 3 in FIG. 2, a parameter of the accelerator generates a sudden change, which represents that the user steps on the accelerator at the moment of the sudden change. Thus, as shown by the curve 4 in FIG. 2, the vehicle enters the driving state, and the engine outputs a torque. The torque output by the engine results in that the vehicle is switched from the driven state to the driving state. From the curve 2, the curve 5, and the curve 6 in FIG. 2, it is obviously seen that each of the longitudinal acceleration of the vehicle, the rotation speed of the engine, and the rotation speed of the input shaft of the gearbox generates fluctuation, which indicates that switching the driving state of the vehicle causes the vehicle to generate shock.

In order to reduce the problem that shock of the vehicle caused by change of the torque transmission direction of the transmission system in the locked state of the fluid torque converter, the prior art provides the following two feasible methods.

(1) When the vehicle is switched from the driven state to the driving state, the shock generated by the vehicle is reduced by reducing a torque at a flywheel end of the engine. This method has limited effect on reducing the shock, on the contrary, because an initial torque at the flywheel end is reduced, acceleration performance of the vehicle is affected and users' acceleration experience is reduced.

(2) Once the vehicle is switched to the driven state, the fluid torque converter is switched to a clutch state. However, when the fluid torque converter is in the clutch state, the engine will continue to inject fuel. At this time, the fuel consumption of the engine cannot be converted into power of the vehicle, thereby resulting in fuel loss and causing increased fuel consumption.

It can be seen that at present, there is no effective solution that can solve the problem of the shock of the vehicle caused by the change of torque transmission direction of the transmission system in the locked state of the fluid torque converter without significantly reducing users' acceleration experience and causing significant fuel consumption. Therefore, the embodiments in this specification provide a method for controlling state switching of a fluid torque converter, which reduces the shock generated by the vehicle when the torque transmission direction of the transmission system of the vehicle changes by performing switching of a state of a fluid torque converter in time.

Figure 3:
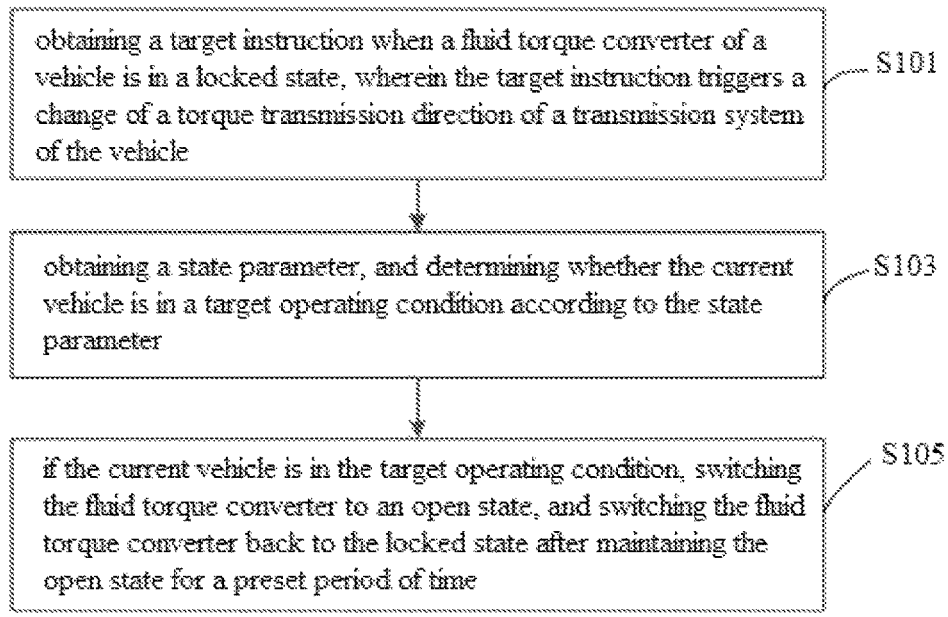
FIG. 3 is a schematic flow chart of a method for controlling state switching of a fluid torque converter provided by an embodiment of this specification.

As shown in FIG. 3, the method includes:

S101: obtaining a target instruction when a fluid torque converter of a vehicle is in a locked state, wherein the target instruction triggers a change of a torque transmission direction of a transmission system of the vehicle.

Embodiments in this specification can put the fluid torque converter of the vehicle be in the locked state in many scenes.

In one embodiment, during both an accelerating process and a decelerating process of the vehicle, the fluid torque converter can be put in the locked state.

Specifically, in one embodiment, during an accelerating process of the vehicle, if an accelerator of the vehicle is less than a preset first accelerator threshold, and a gear position is larger than a first gear position threshold, the fluid torque converter is put in the locked state, for example, acceleration by a small accelerator above the second gear position can trigger locking of the fluid torque converter. Alternatively, during the accelerating process of the vehicle, if the accelerator of the vehicle is larger than a preset second accelerator threshold, the fluid torque converter is put in the locked state, for example, acceleration by a large accelerator above the first gear position can trigger locking of the fluid torque converter. Alternatively, during the accelerating process of the vehicle, if the gear position of the vehicle is less than a second gear position threshold and a speed of the vehicle is larger than a preset speed threshold, the fluid torque converter is put in the locked state, for example, when the vehicle is accelerated in a low speed and a low gear position, the fluid torque converter is put in the locked state. Among them, the preset first accelerator threshold and/or the preset second accelerator threshold can be default system settings, or can be set by users.

Specifically, in another embodiment, during the decelerating process of the vehicle, if the gear position of the vehicle is larger than the second gear position threshold, the fluid torque converter is put in the locked state; for example, if the vehicle is decelerated in any gear position from the third gear position to the eighth gear position, the fluid torque converter is put in the locked state.

In embodiments of this specification, the target instruction can trigger change of the torque transmission direction of the transmission system.

In a possible embodiment, the target instruction can trigger the vehicle to be switched from the driven state to the driving state; when the vehicle is switched from the driven state to the driving state, the torque transmission direction of the transmission system changes. For example, an accelerator triggering instruction generated in a coasting state of the vehicle is a kind of target instruction; the coasting state of the vehicle is a driven state, when a user steps on the accelerator, the accelerator triggering instruction is sent, the vehicle is accelerated, and the vehicle enters the driving state.

In another possible embodiment, the target instruction can trigger the vehicle to be switched from the driving state to the driven state; when the vehicle is switched from the driving state to the driven state, the torque transmission direction of the transmission system changes. For example, an accelerator releasing instruction in a moving process of the vehicle is a kind of target instruction; after a user releases the accelerator, the vehicle enters a coasting state, the vehicle is switched from the driving state to the driven state, and the torque transmission direction of the transmission system changes.

In one embodiment, before the step S101, the method further includes: a step of obtaining a state of the fluid torque converter of the vehicle.

In a possible embodiment, the fluid torque converter can be a comprehensive fluid torque converter. The fluid torque converter includes a hydraulic operating condition, a mechanical operating condition, and a hydraulic-mechanical mixed operating condition. When a locking clutch in the fluid torque converter is in a disengaged state, the fluid torque converter is in the hydraulic operating condition, at this time, the fluid torque converter is not locked and performs hydraulic transmission; when the locking clutch is in a transition state, the fluid torque converter is in the mechanical-hydraulic mixed operating condition, at this time, the fluid torque converter transmits a torque in a mechanical-hydraulic mixed manner; when a friction plate of the locking clutch has been fully fitted, the fluid torque converter is in the mechanical operating condition, at this time, the fluid torque converter is locked and performs mechanical transmission. The essence of locking control of the fluid torque converter is to timely control combination and separation of the locking clutch according to change of external operating conditions of the vehicle.

S103: obtaining a state parameter, and determining whether the current vehicle is in a target operating condition according to the state parameter.

In embodiments of this specification, if the vehicle meets the target operating condition, it is possible to perform state switching for the fluid torque converter; that is, in the target operating condition, it is possible to reduce shock of the vehicle generated by change of the torque transmission direction of the transmission system of the vehicle by the way of switching the state of the fluid torque converter. In specific implementation processes of the embodiments in this specification, the target operating condition can be set according to actual conditions.

Figure 4:
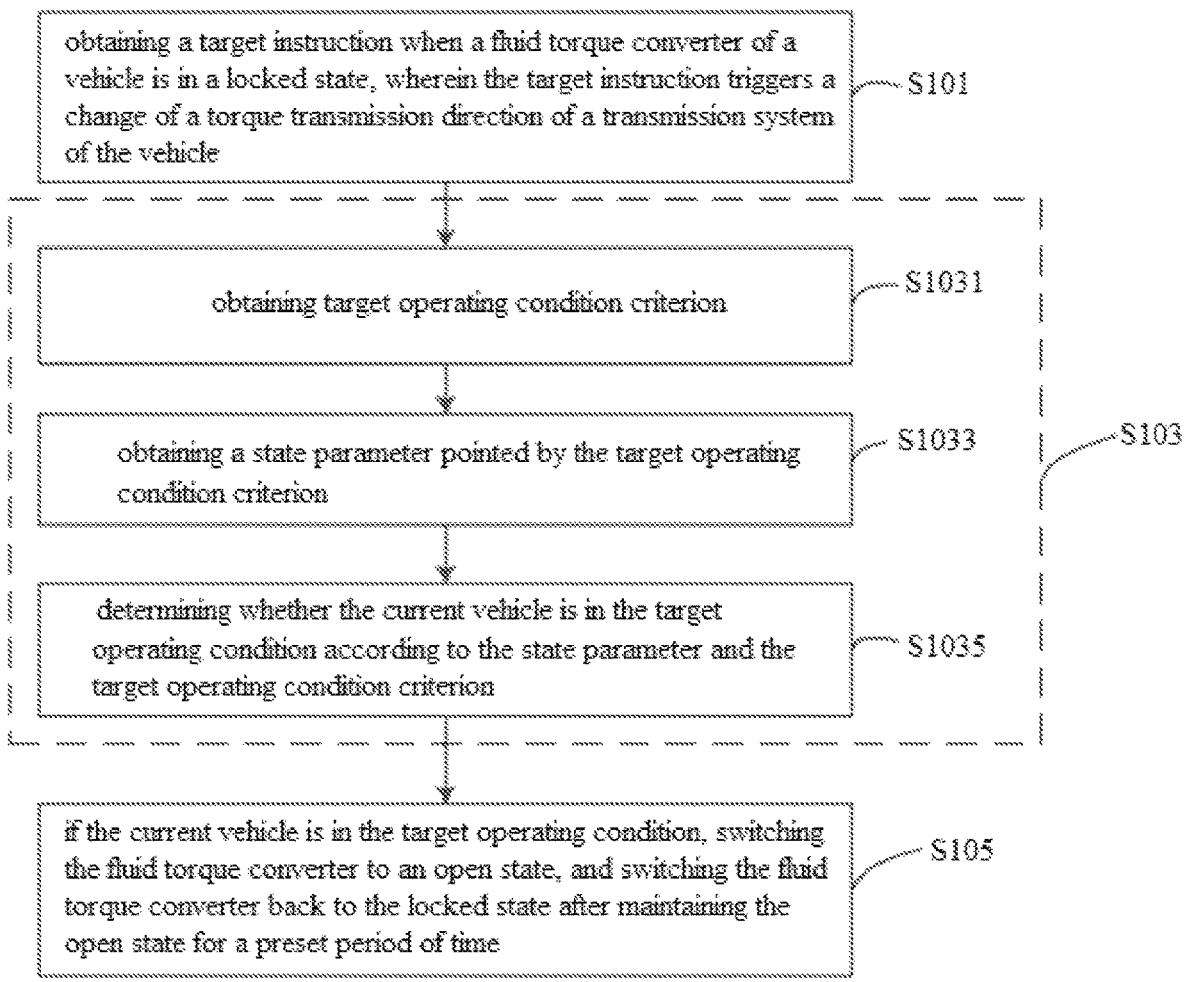
FIG. 4 is a schematic flow chart of obtaining a state parameter and determining whether a current vehicle is in a target operating condition according to the state parameter provided by an embodiment of this specification.

Specifically, as shown in FIG. 4, the step S103 includes:

S1031: obtaining target operating condition criterion.

By setting the target operating condition criterion, the target condition criteria used to judge whether the current vehicle enters the target operating condition is accurately calibrated, the target operating condition can be refined, thereby achieving the purpose of reducing shock of the vehicle by controlling the fluid torque converter to perform state switching in some certain scenes.

S1033: obtaining a state parameter pointed by the target operating condition criterion.

S1035: determining whether the current vehicle is in the target operating condition according to the state parameter and the target operating condition criterion.

In one embodiment, the target operating condition is an operating condition that the vehicle is triggered to be accelerated in a coasting state, correspondingly, the target operating condition criterion includes first criterion, the first criterion is used to determine whether the current vehicle is in the coasting state.

Specifically, in one embodiment, the first criterion can be that a torque of an engine is less than a preset first threshold. Correspondingly, the state parameter is the torque of the engine; the determining whether the current vehicle is in the target operating condition according to the state parameter and the target operating condition criterion includes:

determining whether the torque of the engine is less than the first threshold; if yes, determining that the current vehicle meets the target operating condition.

In another embodiment, the target operating condition criterion further includes second criterion, the second criterion includes any one or combination of driving mode sub-criterion, rotation speed sub-criterion, gear position sub-criterion, accelerator opening degree sub-criterion, accelerator change rate sub-criterion, and gearbox oil temperature sub-criterion.

Specifically, the driving mode sub-criterion includes: if a driving mode is in a target driving mode, determining that the current vehicle meets the driving mode sub-criterion.

In one embodiment, the method for controlling state switching of a fluid torque converter provided by the embodiment of the specification can be started in a scene in which the vehicle is in a certain driving mode. Scene settings of driving modes can be realized through design of the driving mode sub-criterion. The target driving mode can be one driving mode, and can also be multiple driving modes; for example, the target driving mode can be a comfortable mode, users pay attention to driving experience in the comfortable mode and have low tolerance to vibration of vehicles, thus this mode is suitable for using the method for controlling state switching of a fluid torque converter of the embodiment of the specification to reduce jitter of vehicles.

The rotation speed sub-criterion includes: if a rotation speed of the engine is less than or equal to a second threshold, determining that the current vehicle meets the rotation speed sub-criterion.

The gear position sub-criterion includes: if a gear position of the gearbox is in a target gear position, determining that the current vehicle meets the gear position sub-criterion.

Specifically, the target gear position can be one gear position or multiple gear positions.

The accelerator opening degree sub-criterion includes: if an accelerator opening degree is less than or equal to a third threshold, determining that the current vehicle meets the accelerator opening degree sub-criterion.

The accelerator change rate sub-criterion includes: if an accelerator change rate is larger than or equal to a fourth threshold, determining that the current vehicle meets the accelerator change rate sub-criterion.

The gearbox oil temperature sub-criterion includes: if a gearbox oil temperature is in a preset oil temperature range, determining that the current vehicle meets the gearbox oil temperature sub-criterion.

Correspondingly, the determining whether the current vehicle is in the target operating condition according to the state parameter and the target operating condition criterion includes:

determining whether the current vehicle simultaneously meets the first criterion and the second criterion according to the state parameter;

if yes, determining that the current vehicle is in the target operating condition.

In a specific embodiment, the target operating condition criterion includes the first criterion and the second criterion, the second criterion includes the driving mode sub-criterion, the rotation speed sub-criterion, the gear position sub-criterion, the accelerator opening degree sub-criterion, the accelerator change rate sub-criterion, and the gearbox oil temperature sub-criterion; the state parameter pointed by the target operating condition criterion includes: an engine torque, a current driving mode, an engine rotation speed, a gearbox gear position, an accelerator opening degree, an accelerator change rate, and a gearbox oil temperature.

Figure 5:
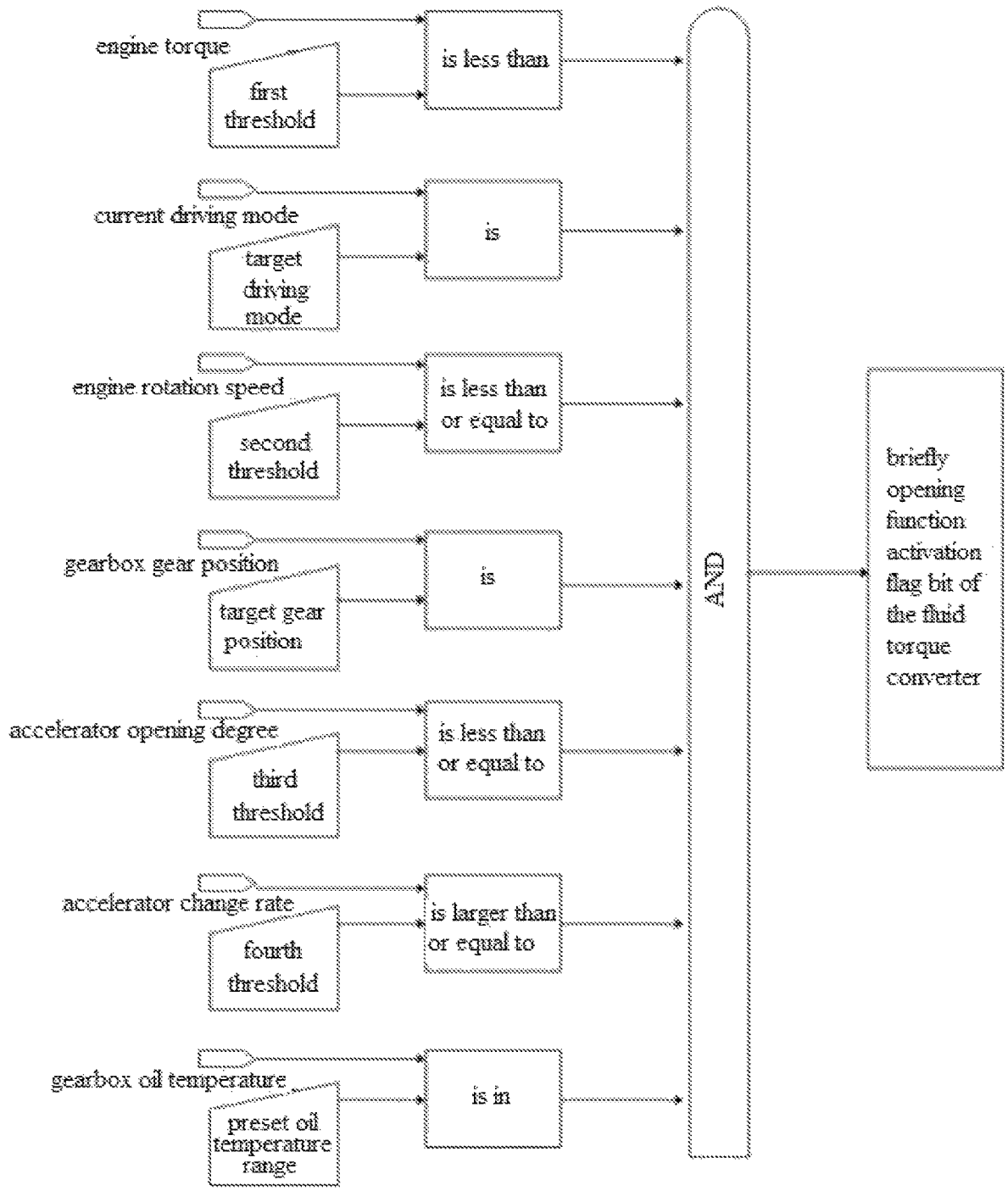
FIG. 5 is a schematic diagram of determining a target operating condition provided by an embodiment of this specification.

As shown in FIG. 5, which shows a schematic diagram of determining the target operating condition, wherein determining whether the current vehicle is in the target operating condition according to the state parameter and the target operating condition criterion includes:

if the engine torque is less than a first threshold;
the current driving mode is in a target driving mode;
the engine rotation speed is less than or equal to a second threshold;
the gearbox gear position is in a target gear position;
the accelerator opening degree is less than or equal to a third threshold;
the accelerator change rate is larger than or equal to a fourth threshold; and
the gearbox oil temperature is in a preset oil temperature range;
determining whether the current vehicle is in the target operating condition.

In a possible embodiment, after the obtaining the state parameter and determining whether the current vehicle is in the target operating condition according to the state parameter, the method further includes:

if the current vehicle is in the target operating condition, activating a briefly opening function activation flag bit of the fluid torque converter.

Specifically, the briefly opening function activation flag bit of the fluid torque converter is used to trigger the fluid torque converter to briefly open; in this embodiment of this specification, the briefly opening can be implemented by setting a period of keeping an open state after the fluid torque converter is triggered to be opened.

S105, if the current vehicle is in the target operating condition, switching the fluid torque converter to an open state, and switching the fluid torque converter back to the locked state after maintaining the open state for a preset period of time.

Figure 6:
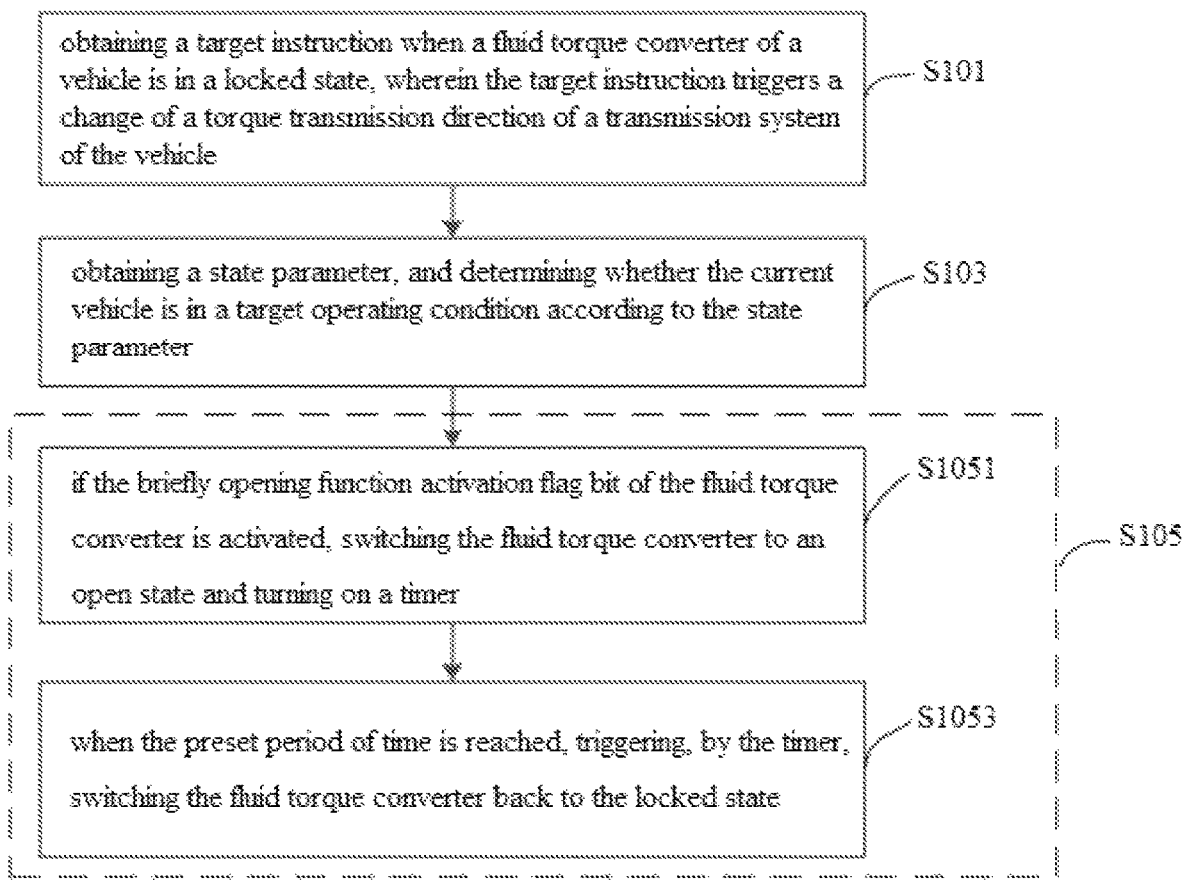
FIG. 6 is a schematic flow chart of switching a fluid torque converter back to a locked state after maintaining an open state for a preset period of time provided by an embodiment of this specification.

In a possible embodiment, the if the current vehicle is in the target operating condition, switching the fluid torque converter to an open state, and switching the fluid torque converter back to the locked state after maintaining the open state for a preset period of time, as shown in FIG. 6, includes:

S1051: if the briefly opening function activation flag bit of the fluid torque converter is activated, switching the fluid torque converter to an open state and turning on a timer.

S1053: when the preset period of time is reached, triggering, by the timer, switching the fluid torque converter back to the locked state.

Figure 7:
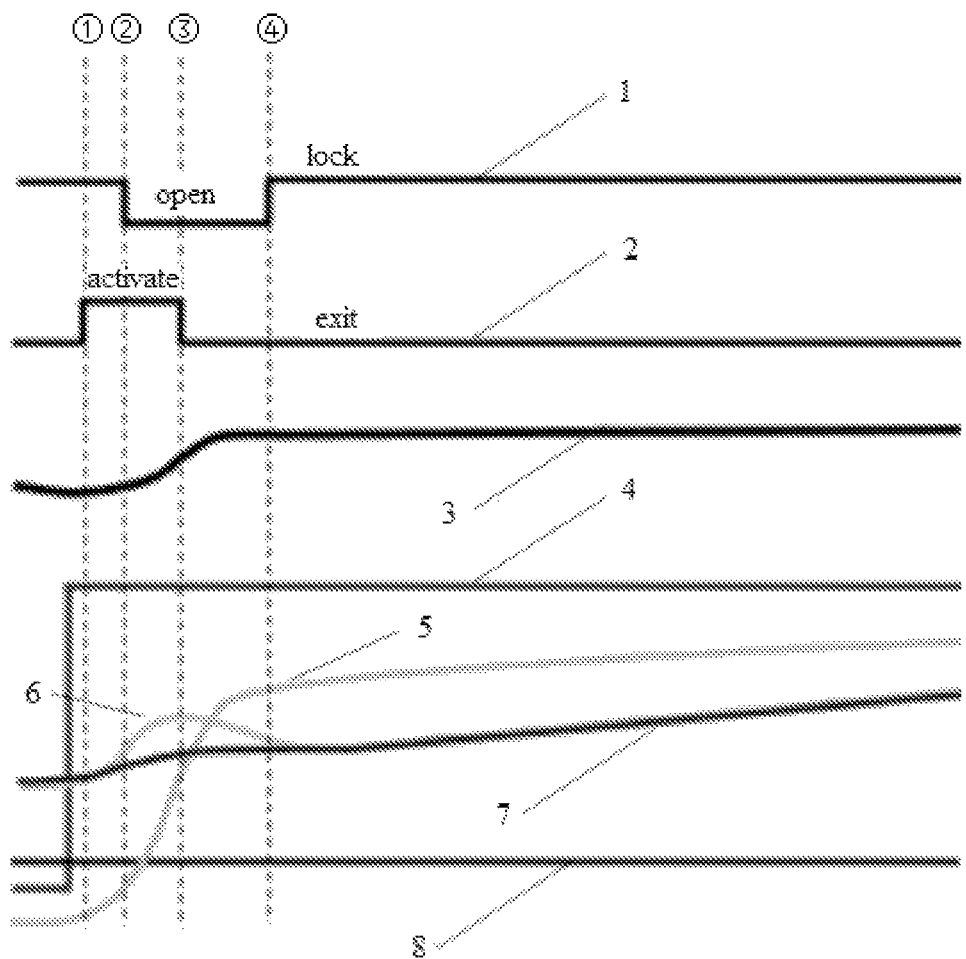
FIG. 7 is a schematic diagram of changes of parameters related to a vehicle according to an embodiment of this specification in a scene of stepping on an accelerator when the vehicle coasts provided by an embodiment of this specification, being in a locked state.

As shown in FIG. 7, which shows a schematic diagram of changes of parameters related to a vehicle according to an embodiment of this specification in a scene of stepping on an accelerator when the vehicle coasts, being in a locked state. The curve 1 represents a state of the fluid torque converter, the curve 2 represents the briefly opening function activation flag bit of the fluid torque converter, the curve 3 represents a longitudinal acceleration of the vehicle, the curve 4 represents the accelerator, the curve 5 represents the engine torque, the curve 6 represents the engine rotation speed, the curve 7 represents the rotation speed of the input shaft of the gearbox, and the curve 8 represents the actual gear position of the gearbox.

The vehicle is in the driven state when coasting, and after a user steps on the accelerator, the vehicle enters the driving state; therefore, the state of the vehicle generates switching from the driven state to the driving state. As shown by the curve 4 in FIG. 7, the accelerator parameter generates a sudden change, which represents that the user steps on the accelerator at the moment of the sudden change, and switching of the state of the vehicle from the driven state to the driving state is triggered. Further, as shown by the curve 5 in FIG. 7, the vehicle enters the driving state, and the engine outputs a torque. The torque output by the engine results in that the vehicle is switched from the driven state to the driving state. As shown by the curve 2 in FIG. 7, the briefly opening function activation flag bit of the fluid torque converter is activated; correspondingly, as shown by the curve 1, the fluid torque converter correspondingly generates short state switching, and keeps the open state for a short period of time. The curve 8 in FIG. 7 represents that the actual gear position of the gearbox does not change, and the curve 3, the curve 6, and the curve 7 in the figure represents the longitudinal acceleration of the vehicle, the engine rotation speed, and the rotation speed of the input shaft of the gearbox. Obviously, when the vehicle is switched from the driven state to the driving state, since the fluid torque converter is briefly opened, none of the engine rotation speed, the rotation speed of the input shaft of the gearbox, and the longitudinal acceleration of the vehicle generates fluctuation, it is indicated that the vehicle does not generate shock when the driving state of the vehicle is switched.

In FIG. 7, four critical moments are marked. At the moment 1, a condition of triggering the briefly opening function of the fluid torque converter is met, and the briefly opening function activation flag bit of the fluid torque converter is activated; at the moment 2, the locking clutch of the fluid torque converter is opened, and the fluid torque converter is in the open state; at the moment 3, a condition of exiting from the briefly opening function of the fluid torque converter is met, and the briefly opening function activation flag bit of the fluid torque converter is reset; at the moment 4, the fluid torque converter is locked, and the engagement of the clutch of the fluid torque converter is completed.

The technical solution described in the embodiments of this specification takes the fluid torque converter as an implementation condition, reduces vibration generated when the direction of the moment of force output by the transmission system of the vehicle is switched by switching the state of the fluid torque converter, and can be adapted to various vehicles equipped with fluid torque converters. Generally, vehicles equipped with AT automatic transmission are all equipped with fluid torque converters, and vehicles equipped with CVT stepless transmission can also be equipped with fluid torque converters, both the two types of vehicles can implement the method for controlling state switching of a fluid torque converter described in the embodiments of this specification.

Aiming at the problem existing in the prior art that: when a fluid torque converter is locked, since there are inherent gaps between transmission mechanisms in a transmission system and the transmission system is in a hard connection state, when a direction of a torque output by the transmission system is switched, transmission parts may generate impacts, thereby resulting in shock of a whole vehicle, embodiments of this specification provide a method for controlling state switching of a fluid torque converter. The controlling method, by accurately recognizing a target operating condition, can control a fluid torque converter to open quickly and briefly under the target operating condition, such that shock caused by impact of transmission components is absorbed when a torque transmission direction of a transmission system is switched, and jitter of a vehicle is reduced. Moreover, by controlling the fluid torque converter to close again after briefly opening, fuel consumption is reduced. The fuel consumption of the vehicle is taken into account while achieving vehicle shock absorption, thus driving experience of users is improved on the basis of ensuring fuel economy.

Figure 8:
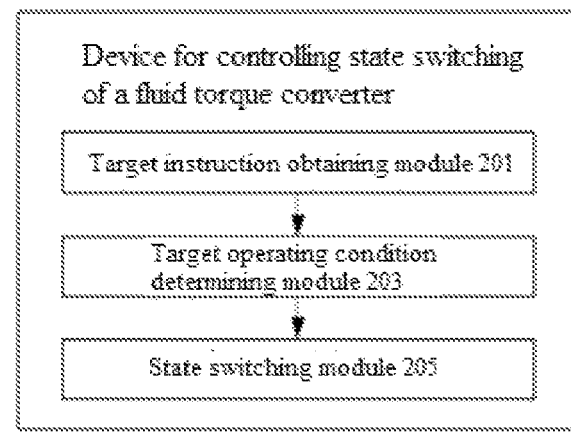
FIG. 8 is a schematic diagram of a device for controlling state switching of a fluid torque converter provided by an embodiment of this specification.

Embodiments of this specification further provide a device for controlling state switching of a fluid torque converter, as shown in FIG. 8, the device includes:

A target instruction obtaining module 201 configured to obtain a target instruction when a fluid torque converter of a vehicle is in a locked state, wherein the target instruction triggers a change of a torque transmission direction of a transmission system of the vehicle.

In a possible embodiment, the fluid torque converter can be a comprehensive fluid torque converter. The fluid torque converter includes a hydraulic operating condition, a mechanical operating condition, and a hydraulic-mechanical mixed operating condition. When a locking clutch in the fluid torque converter is in a disengaged state, the fluid torque converter is in the hydraulic operating condition, at this time, the fluid torque converter is not locked and performs hydraulic transmission; when the locking clutch is in a transition state, the fluid torque converter is in the mechanical-hydraulic mixed operating condition, at this time, the fluid torque converter transmits a torque in a mechanical-hydraulic mixed manner; when a friction plate of the locking clutch has been fully fitted, the fluid torque converter is in the mechanical operating condition, at this time, the fluid torque converter is locked and performs mechanical transmission. The essence of locking control of the fluid torque converter is to timely control combination and separation of the locking clutch according to change of external operating conditions of the vehicle.

In a possible embodiment, the target instruction can trigger the vehicle to be switched from the driven state to the driving state; when the vehicle is switched from the driven state to the driving state, the torque transmission direction of the transmission system changes. For example, an accelerator triggering instruction generated in a coasting state of the vehicle is a kind of target instruction; the coasting state of the vehicle is a driven state, when a user steps on the accelerator, the accelerator triggering instruction is sent, the vehicle is accelerated, and the vehicle enters the driving state.

In another possible embodiment, the target instruction can trigger the vehicle to be switched from the driving state to the driven state; when the vehicle is switched from the driving state to the driven state, the torque transmission direction of the transmission system changes. For example, an accelerator releasing instruction in a moving process of the vehicle is a kind of target instruction; after a user releases the accelerator, the vehicle enters a coasting state, the vehicle is switched from the driving state to the driven state, and the torque transmission direction of the transmission system changes.

A target operating condition determining module 203 configured to obtain a state parameter, and determine whether the current vehicle is in a target operating condition according to the state parameter.

A state switching module 205 configured to: if the current vehicle is in the target operating condition, switch the fluid torque converter to an open state, and switch the fluid torque converter back to the locked state after maintaining the open state for a preset period of time.

Figure 9:
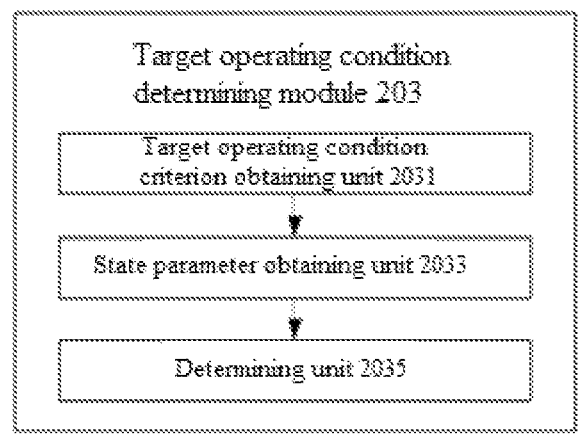
FIG. 9 is a schematic diagram of a target operating condition determining module provided by an embodiment of this specification.

In one embodiment, as shown in FIG. 9, the target operating condition determining module 203 includes:
- a target operating condition criterion obtaining unit 2031 configured to obtain target operating condition criterion;
- a state parameter obtaining unit 2033 configured to obtain a state parameter pointed by the target operating condition criterion;
- a determining unit 2035 configured to determine whether the current vehicle is in the target operating condition according to the state parameter and the target operating condition criterion.

In one embodiment, the target operating condition is a operating condition that the vehicle is triggered to be accelerated in a coasting state, correspondingly, the target operating condition criterion includes first criterion, the first criterion is used to determine whether the current vehicle is in the coasting state.

In another embodiment, the target operating condition criterion further includes second criterion, the second criterion includes any one or combination of driving mode sub-criterion, rotation speed sub-criterion, gear position sub-criterion, accelerator opening degree sub-criterion, accelerator change rate sub-criterion, and gearbox oil temperature sub-criterion.

In a specific embodiment, the target operating condition criterion obtaining unit 2031 can obtain the first criterion and the second criterion, the second criterion includes the driving mode sub-criterion, the rotation speed sub-criterion, the gear position sub-criterion, the accelerator opening degree sub-criterion, the accelerator change rate sub-criterion, and the gearbox oil temperature sub-criterion. The state parameter pointed by the target operating condition criterion includes: an engine torque, a current driving mode, an engine rotation speed, a gearbox gear position, an accelerator opening degree, an accelerator change rate, and a gearbox oil temperature.

The determining unit 2035 is used to perform the following determining steps:
- if the engine torque is less than a first threshold;
- the current driving mode is in a target driving mode;
- the engine rotation speed is less than or equal to a second threshold;
- the gearbox gear position is in a target gear position,
- the accelerator opening degree is less than or equal to a third threshold;
- the accelerator change rate is larger than or equal to a fourth threshold; and
- the gearbox oil temperature is in a preset oil temperature range;
- determining whether the current vehicle is in the target operating condition.

It should be noted that the device provided by above embodiments, when implementing the functions thereof, is only illustrated according to the division of above functional modules. In practical applications, the functions can be allocated to be completed by different functional modules according to needs, that is, the internal structure of the device is divided into different functional modules to complete all or some of the functions described above. In addition, the device provided by above embodiments belong to the same concept as the method embodiments, and the specific implementation process is detailed in the method embodiments and will not be repeated here.

In an embodiment, a vehicle is further provided, the vehicle can include an engine, a fluid torque converter, a gearbox, and wheels; the engine is equipped with an AT automatic transmission or a CVT stepless transmission.

The fluid torque converter can be a comprehensive fluid torque converter. The fluid torque converter includes a hydraulic operating condition, a mechanical operating condition, and a hydraulic-mechanical mixed operating condition. When a locking clutch in the fluid torque converter is in a disengaged state, the fluid torque converter is in the hydraulic operating condition, at this time, the fluid torque converter is not locked and performs hydraulic transmission; when the locking clutch is in a transition state, the fluid torque converter is in the mechanical-hydraulic mixed operating condition, at this time, the fluid torque converter transmits a torque in a mechanical-hydraulic mixed manner; when a friction plate of the locking clutch has been fully fitted, the fluid torque converter is in the mechanical operating condition, at this time, the fluid torque converter is locked and performs mechanical transmission. The essence of locking control of the fluid torque converter is to timely control combination and separation of the locking clutch according to change of external operating conditions of the vehicle.

The vehicle includes a device for controlling state switching of a fluid torque converter provided by embodiments of this specification, which includes:
- a target instruction obtaining module configured to obtain a target instruction when a fluid torque converter of a vehicle is in a locked state, wherein the target instruction triggers a change of a torque transmission direction of a transmission system of the vehicle;
- a target operating condition determining module configured to obtain a state parameter, and determine whether the current vehicle is in a target operating condition according to the state parameter; and
- a state switching module configured to: if the current vehicle is in the target operating condition, switch the fluid torque converter to an open state, and switch the fluid torque converter back to the locked state after maintaining the open state for a preset period of time.

The device for controlling state switching of a fluid torque converter included in the vehicle provided by the embodiment of this specification belongs to the same invention concept as the method and device for controlling state switching of a fluid torque converter mentioned above, and details thereof are not repeated here.

In one embodiment, the vehicle can further include a vehicular terminal, the vehicular terminal includes a processor, a memory, a communication interface, and a communication bus; the processor, the memory, and the communication interface are connected and complete communication between each other through the communication bus.

The memory stores executable program codes, and the communication interface is used for wireless communication.

The processor is used to call the executable program codes in the memory to execute, so as to implement the method for controlling state switching of a fluid torque converter as provided by the above method embodiments.

In an embodiment, a computer storage medium is further provided, the computer storage medium stores at least one instruction or at least one program, the at least one instruction or at least one program is loaded and executed by a processor to implement the method for controlling state switching of a fluid torque converter provided by embodiments of this specification.

The storage medium can be located in at least one network server of multiple network servers of a computer network. Optionally, in this embodiment, the storage medium can include, but is not limited to, various media that can be store program codes, such as a U-disk, an ROM (Read-Only Memory), an RAM (Random Access Memory), a mobile hard-disk, a magnet disk or an optical disk, and so on.

Specifically, regarding the method for controlling state switching of a fluid torque converter, the method includes:
  obtaining a target instruction when a fluid torque converter of a vehicle is in a locked state, wherein the target instruction triggers a change of a torque transmission direction of a transmission system of the vehicle;
  obtaining a state parameter, and determining whether the current vehicle is in a target operating condition according to the state parameter; and
  if the current vehicle is in the target operating condition, switching the fluid torque converter to an open state, and switching the fluid torque converter back to the locked state after maintaining the open state for a preset period of time.

It should be noted that the order of the embodiments in this specification is only for description and does not represent advantages or disadvantages of the embodiments. Moreover, specific embodiments of this specification are described above. Other embodiments are within the scope of the appended claims. In some cases, actions or steps recorded in the claims may be performed in a sequence different from that in the embodiments and can still achieve desired results. In addition, the process depicted in the drawings does not necessarily require a particular order or a sequential order shown to achieve the desired result. In some embodiments, multitasking processing and parallel processing are also possible or may be advantageous.

Each embodiment in this specification is described in a progressive manner. Same and similar parts of various embodiments can be referred to each other. Each embodiment focuses on differences from other embodiments. In particular, for the device and vehicle embodiments, since they are basically similar to the method embodiments, the description is relatively simple, and the related parts can refer to partial description of the method embodiments.

The above description has fully disclosed the specific embodiments of the invention. It should be pointed out that any change made by a person skilled in the art to the specific embodiment of the invention does not depart from the scope of the claims of the invention. Accordingly, the scope of the claims of the invention is not limited to the above-mentioned specific embodiments.

The above description has fully disclosed specific embodiments of the present invention. It should be pointed out that any change made by a person skilled in the art to the specific embodiments of the present invention does not depart from the scope of the claims of the present invention. Accordingly, the scope of the claims of the present invention is not limited to the above-mentioned specific embodiments.

What is claimed is:

1. A method for controlling state switching of a fluid torque converter, comprising: obtaining a target instruction when the fluid torque converter of a vehicle is in a locked state, wherein the target instruction triggers a change of a torque transmission direction of a transmission system of the vehicle; obtaining a state parameter, and determining whether the vehicle is in a target operating condition according to the state parameter; and if the vehicle is in the target operating condition, switching the fluid torque converter to an open state, and switching the fluid torque converter back to the locked state after maintaining the open state for a preset period of time;
  wherein the obtaining a state parameter, and determining whether the current vehicle is in a target operating condition according to the state parameter comprises: obtaining target operating condition criterion; obtaining a state parameter pointed by the target operating condition criterion; and determining whether the vehicle is in the target operating condition according to the state parameter and the target operating condition criterion.

2. The method according to claim 1, wherein before the obtaining a target instruction when a fluid torque converter of a vehicle is in a locked state, wherein the target instruction triggers a change of a torque transmission direction of a transmission system of the vehicle, the method further comprises: obtaining a state of the fluid torque converter of the vehicle.

3. The method according to claim 1, wherein the fluid torque converter is put in the locked state during an accelerating process or a decelerating process of the vehicle.

4. The method according to claim 3, wherein the fluid torque converter is put in the locked state during an accelerating process or a decelerating process of the vehicle comprises: during the accelerating process of the vehicle, if an accelerator opening degree of the vehicle is less than a preset first accelerator threshold, and a gear position is larger than a first gear position threshold, the fluid torque converter is put in the locked state; or during the accelerating process of the vehicle, if the accelerator opening degree of the vehicle is larger than a preset second accelerator threshold, the fluid torque converter is put in the locked state; or during the accelerating process of the vehicle, if the gear position of the vehicle is less than a second gear position threshold and a speed of the vehicle is larger than a preset speed threshold, the fluid torque converter is put in the locked state.

5. The method according to claim 3, wherein that the fluid torque converter is put in the locked state during an accelerating process or a decelerating process of the vehicle comprises: during the decelerating process of the vehicle, if the gear position of the vehicle is larger than a second gear position threshold, the fluid torque converter is put in the locked state.

6. The method according to claim 1, wherein the target instruction triggers the vehicle to be switched from a driven state to a driving state, or triggers the vehicle to be switched from the driving state to the driven state.

7. The method according to claim 6, wherein the target instruction is an accelerator triggering instruction generated during a coasting state of the vehicle, or an accelerator releasing instruction during a moving process of the vehicle.

8. The method according to claim 1, wherein the fluid torque converter is a comprehensive fluid torque converter, and the fluid torque converter includes a hydraulic operating condition, a mechanical operating condition, and a hydraulic-methanical mixed operating condition; when a locking clutch in the fluid torque converter is in a disengaged state, the fluid torque converter is in the hydraulic operating condition, and the fluid torque converter is not locked and performs hydraulic transmission; when the locking clutch is in a transition state, the fluid torque converter is in the mechanical-hydraulic mixed operating condition, and the fluid torque converter transmits a torque in a mechanical-hydraulic mixed manner; when a friction plate of the locking clutch has been fully fitted, the fluid torque converter is in the mechanical operating condition, and the fluid torque converter is locked and performs mechanical transmission.

9. The method according to claim 1, wherein the target operating condition is an operating condition that the vehicle is triggered to be accelerated in a coasting state; correspondingly, the target operating condition criterion comprises first criterion, the first criterion is configured to determine whether the current vehicle is in the coasting state.

10. The method according to claim 9, wherein the first criterion is that torque of an engine is less than a preset first threshold; the state parameter is the torque of the engine; the determining whether the current vehicle is in the target operating condition according to the state parameter and the target operating condition criterion comprises: determining whether the torque of the engine is less than the first threshold; if yes, determining that the current vehicle meets the target operating condition.

11. The method according to claim 9, wherein the target operating condition criterion further comprises second criterion, the second criterion comprises any one or combination of driving mode sub-criterion, rotation speed sub-criterion, gear position sub-criterion, accelerator opening degree sub-criterion, accelerator change rate sub-criterion, and gearbox oil temperature sub-criterion.

12. The method according to claim 11, wherein that the driving mode sub-criterion comprises: if a driving mode is in a target driving mode, determining that the current vehicle meets the driving mode sub-criterion; the rotation speed sub-criterion comprises: if a rotation speed of the engine is less than or equal to a second threshold, determining that the current vehicle meets the rotation speed sub-criterion; the gear position sub-criterion comprises: if a gear position of the gearbox is in a target gear position, determining that the current vehicle meets the gear position sub-criterion; the accelerator opening degree sub-criterion comprises: if an accelerator opening degree is less than or equal to a third threshold, determining that the current vehicle meets the accelerator opening degree sub-criterion; the accelerator change rate sub-criterion comprises: if an accelerator change rate is larger than or equal to a fourth threshold, determining that the current vehicle meets the accelerator change rate sub-criterion; the gearbox oil temperature sub-criterion comprises: if a gearbox oil temperature is in a preset oil temperature range, determining that the current vehicle meets the gearbox oil temperature sub-criterion.

13. The method according to claim 11, wherein the determining whether the current vehicle is in the target operating condition according to the state parameter and the target operating condition criterion comprises: determining whether the current vehicle simultaneously meets the first criterion and the second criterion according to the state parameter; if yes, determining that the current vehicle is in the target operating condition.

14. The method according to claim 1, wherein the target operating condition criterion comprises first criterion and second criterion, the second criterion comprises driving mode sub-criterion, rotation speed sub-criterion, gear position sub-criterion, accelerator opening degree sub-criterion, accelerator change rate sub-criterion, and gearbox oil temperature sub-criterion; the obtaining a state parameter pointed by the target operating condition criterion comprises: obtaining an engine torque, a current driving mode, an engine rotation speed, a gearbox gear position, an accelerator opening degree, an accelerator change rate, and a gearbox oil temperature; the determining whether the current vehicle is in the target operating condition according to the state parameter and the target operating condition criterion comprises: if the engine torque is less than a first threshold, the current driving mode is in a target driving mode; the engine rotation speed is less than or equal to a second threshold, the gearbox gear position is in a target gear position, the accelerator opening degree is less than or equal to a third threshold, the accelerator change rate is larger than or equal to a fourth threshold; and the gearbox oil temperature is in a preset oil temperature range, determining whether the current vehicle is in the target operating condition.

15. The method according to claim 1, wherein after the obtaining the state parameter and determining whether the current vehicle is in the target operating condition according to the state parameter, the method further comprises: if the current vehicle is in the target operating condition, activating a briefly opening function activation flag bit of the fluid torque converter.

16. The method according to claim 15, wherein the if the current vehicle is in the target operating condition, switching the fluid torque converter to an open state, and switching the fluid torque converter back to the locked state after maintaining the open state for a preset period of time comprises: if the briefly opening function activation flag bit of the fluid torque converter is activated, switching the fluid torque converter to an open state and turning on a timer; when the preset period of time is reached, triggering, by the timer, switching the fluid torque converter back to the locked state.

17. A device for controlling state switching of a fluid torque converter, comprising: a target instruction obtaining module configured to obtain a target instruction when the fluid torque converter of a vehicle is in a locked state, wherein the target instruction triggers a change of a torque transmission direction of a transmission system of the vehicle; a target operating condition determining module configured to obtain a state parameter, and determine whether the vehicle is in a target operating condition according to the state parameter; and a state switching module configured to: if the vehicle is in the target operating condition, switch the fluid torque converter to an open state, and switch the fluid torque converter back to the locked state after maintaining the open state for a preset period of time;
  wherein the target operating condition determining module comprises: a target operating condition criterion obtaining unit configured to obtain target operating condition criterion; a state parameter obtaining unit configured to obtain a state parameter pointed by the target operating condition criterion; and a determining unit configured to determine whether the vehicle is in the target operating condition according to the state parameter and the target operating condition criterion.

18. A computer storage medium, wherein the computer storage medium stores at least one instruction or at least one program, the at least one instruction or at least one program is configured to be loaded and executed by a processor to implement a method for controlling state switching of a fluid torque converter comprising: obtaining a target instruction when the fluid torque converter of a vehicle is in a locked state, wherein the target instruction triggers a change of a torque transmission direction of a transmission system of the vehicle; obtaining a state parameter, and determining whether the vehicle is in a target operating condition according to the state parameter; and if the vehicle is in the target operating condition, switching the fluid torque converter to an open state, and switching the fluid torque converter back to the locked state after maintaining the open state for a preset period of time;

wherein the obtaining a state parameter, and determining whether the vehicle is in a target operating condition according to the state parameter comprises: obtaining target operating condition criterion; obtaining a state parameter pointed by the target operating condition criterion; and determining whether the vehicle is in the target operating condition according to the state parameter and the target operating condition criterion.

* * * * *